US010852627B2

(12) United States Patent
Sakai

(10) Patent No.: US 10,852,627 B2
(45) Date of Patent: Dec. 1, 2020

(54) IMAGE DISPLAY DEVICE

(71) Applicant: ALPS ALPINE CO., LTD., Tokyo (JP)

(72) Inventor: Shigefumi Sakai, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/412,636

(22) Filed: May 15, 2019

(65) Prior Publication Data

US 2019/0265582 A1   Aug. 29, 2019

Related U.S. Application Data

(63) Continuation of application No. PCT/JP2016/087393, filed on Dec. 15, 2016.

(51) Int. Cl.
*G03B 21/14* (2006.01)
*G02B 5/10* (2006.01)
*G02B 27/01* (2006.01)
*G02B 27/09* (2006.01)
*B60K 35/00* (2006.01)

(52) U.S. Cl.
CPC .......... *G03B 21/142* (2013.01); *B60K 35/00* (2013.01); *G02B 5/10* (2013.01); *G02B 27/0101* (2013.01); *G02B 27/0977* (2013.01); *G02B 2027/0141* (2013.01); *G02B 2027/0181* (2013.01)

(58) Field of Classification Search
CPC ........ G03B 21/28; G03B 21/56; G03B 21/62; G03B 21/142; G03B 21/145; G03B 21/208; G03B 21/602; G02B 27/01; G02B 27/0101; G02B 27/144; G02B 27/0172; G02B 27/283; G02B 27/0977; B60K 2370/31; B60K 2370/66; B60K 2370/152; B60K 2370/177; B60K 2370/334

See application file for complete search history.

(56) References Cited

U.S. PATENT DOCUMENTS 9,188,779 B2   11/2015   Sakai
10,120,189 B2   11/2018   Saito et al.
10,156,720 B2   12/2018   Ando et al.
(Continued)

FOREIGN PATENT DOCUMENTS

JP   H07-005886 U   1/1995
JP   2009-150947   7/2009
(Continued)

OTHER PUBLICATIONS

International Search Report for PCT/JP2016/087393 dated Feb. 28, 2017.

*Primary Examiner* — Sultan Chowdhury
(74) *Attorney, Agent, or Firm* — IPUSA, PLLC

(57) ABSTRACT

An image display device includes a display unit which displays a first image and a second image, and a projection optical system which directs light of the first image and light of the second image toward a windshield. The display unit displays the first image and the second image in different display areas on the same plane. The projection optical system sets an image point of the light of the first image and an image point of the light of the second image, so that a first virtual image and a second virtual image are formed at positions having different distances from a viewing point within a visible area.

5 Claims, 10 Drawing Sheets

(56) References Cited

U.S. PATENT DOCUMENTS

| | | | |
|---|---|---|---|
| 2009/0160736 A1 | 6/2009 | Shikita | |
| 2015/0108782 A1* | 4/2015 | Chou | G03B 21/208 296/90 |
| 2016/0142689 A1* | 5/2016 | Karikomi | H04N 9/3155 348/745 |
| 2016/0178902 A1* | 6/2016 | Ando | B60R 1/00 348/115 |
| 2016/0193922 A1* | 7/2016 | Kuzuhara | G02B 27/0101 345/7 |
| 2016/0202479 A1* | 7/2016 | Okayama | G02B 27/0101 359/633 |
| 2016/0266384 A1* | 9/2016 | Nakamura | G02B 26/101 |
| 2017/0235138 A1 | 8/2017 | Morohashi et al. | |
| 2018/0143431 A1* | 5/2018 | Matsuura | G02B 27/0093 |

FOREIGN PATENT DOCUMENTS

| | | |
|---|---|---|
| JP | 2013-214008 | 10/2013 |
| JP | 2015-034919 | 2/2015 |
| JP | 2016-014861 | 1/2016 |
| JP | 2016-045252 | 4/2016 |
| WO | 2016/190135 | 12/2016 |

\* cited by examiner

IMAGE DISPLAY DEVICE

CROSS-REFERENCE TO RELATED APPLICATIONS

This application is a continuation application of International Application No. PCT/JP2016/087393 filed on Dec. 15, 2016 and designated the U.S., the entire contents of which are incorporated herein by reference.

BACKGROUND OF THE INVENTION

1. Field of the Invention

The present invention relates to image display devices such as a head-up display device or the like, and more particularly to an image display device which displays a virtual image, which is to be visually recognized, through a transparent member such as a windshield or the like.

2. Description of the Related Art

A head-up display for automobiles projects an image onto glass of a front window (windshield) or a combiner, to display various information as a virtual image in front of a driver's field of vision, and recently, products of various types have been reduced to practice.

In a general head-up display, an intermediate image, that is imaged on a screen such as a diffuser or the like, is projected onto the windshield or the combiner through a projection optical system (magnifying mirror or the like). Accordingly, even in a case where the position of the projection optical system is fixed, the position of the virtual image, in front of the driver and visible from the driver, can be varied in forward and backward directions, by varying the position of the screen where the intermediate image is imaged.

In a head-up display device described in Japanese Laid-Open Patent Publication No. 2009-150947, for example, images are respectively displayed on three screens, and the images are reflected by a mirror and projected onto the windshield (for example, refer to FIG. 3 of Japanese Laid-Open Patent Publication No. 2009-150947). Because distances from the mirror, which is a projection means, to the three screens, are different, the three virtual images corresponding to the images respectively displayed on the three screens are visible from the driver as if the positions of the three virtual images in front of the driver were different in the forward and backward directions.

In a head-up display device described in Japanese Laid-Open Patent Publication No. 2015-34919, for example, images are respectively displayed on two screens, and the images are reflected by a concave mirror of an optical component and projected onto the windshield (for example, refer to FIG. 1 and FIG. 5 of Japanese Laid-Open Patent Publication No. 2015-34919). In this head-up display device, the two virtual images corresponding to the images respectively displayed on the two screens are also visible from the driver as if the positions of the two virtual images in front of the driver were different in the forward and backward directions.

When imaging the intermediate image on the screen by the scanning light beam, the resolution improves more with smaller beam diameters, and normally, the light beam incident to the screen is converged by an optical system. Because the light beam is converged by the optical system, the beam diameter differs depending on the distance from the optical system. When one screen is provided, a satisfactory resolution can be obtained by configuring the optical system to align a focal point on this screen (to minimize the beam diameter). However, when a plurality of screens are provided and the focal point of the light beam is aligned to one screen, the beam diameter becomes large at the other screens. For this reason, in the head-up display device described in Japanese Laid-Open Patent Publication No. 2009-150947 referred above, when the focal point of the light beam is aligned to one screen, the resolution deteriorates at the other two screens. The differences among the beam diameters depending on the positions of the screens are reduced when the optical system is configured to form the light beam into approximately parallel light, however, because the beam diameter cannot be sufficiently reduced according to this method, the resolution at each screen deteriorates.

On the other hand, in the head-up display device described in Japanese Laid-Open Patent Publication No. 2015-34919, a MEMS mirror that is used can vary a radius of curvature of the concave mirror, and the focal point can be aligned to each of the two screens (for example, refer to FIG. 5 of Japanese Laid-Open Patent Publication No. 2015-34919). However, when the radius of curvature of the concave mirror is controlled by the MEMS mirror, there are problems in that the computation load becomes large due to the complex control of the radius of curvature that is required, and that it is difficult to accurately align the focal point of the light beam having a small spot diameter on the screen.

Further, the conventional head-up display devices described above require the plurality of screens, on which the intermediate images are imaged, to be arranged at different positions with respect to the optical system, and there is a problem in that the size of the device becomes large.

SUMMARY OF THE INVENTION

Accordingly, one object of embodiments of the present invention is to provide an image display device which can form a plurality of virtual images having different distances from a viewing point, using a simple configuration.

According to one aspect of the embodiments of the present invention, an image display device which directs light of a first image and light of a second image toward a translucent member, reflects the light of the first image and the light of the second image from the translucent member toward a visible area, and displays a first virtual image corresponding to the first image and a second virtual image corresponding to the second image at positions visible through the translucent member when viewed from the visible area, includes a display unit configured to display the first image and the second image, and a projection optical system that directs the light of the first image and the light of the second image toward the translucent member, wherein the display unit displays the first image and the second image at different display areas on the same plane, and wherein the projection optical system sets an image point of the light of the first image and an image point of the light of the second image, so that the first virtual image and the second virtual image are formed at positions having different distances from a viewing point within the visible area.

Other objects and further features of the present invention will be apparent from the following detailed description when read in conjunction with the accompanying drawings.

BRIEF DESCRIPTION OF THE DRAWINGS

FIG. 4A illustrates an example provided with two display areas on a single display surface, and FIG. 4B illustrates an example provided with a display area in each of two display surfaces.

DESCRIPTION OF THE EMBODIMENTS

First Embodiment

Figure 1:
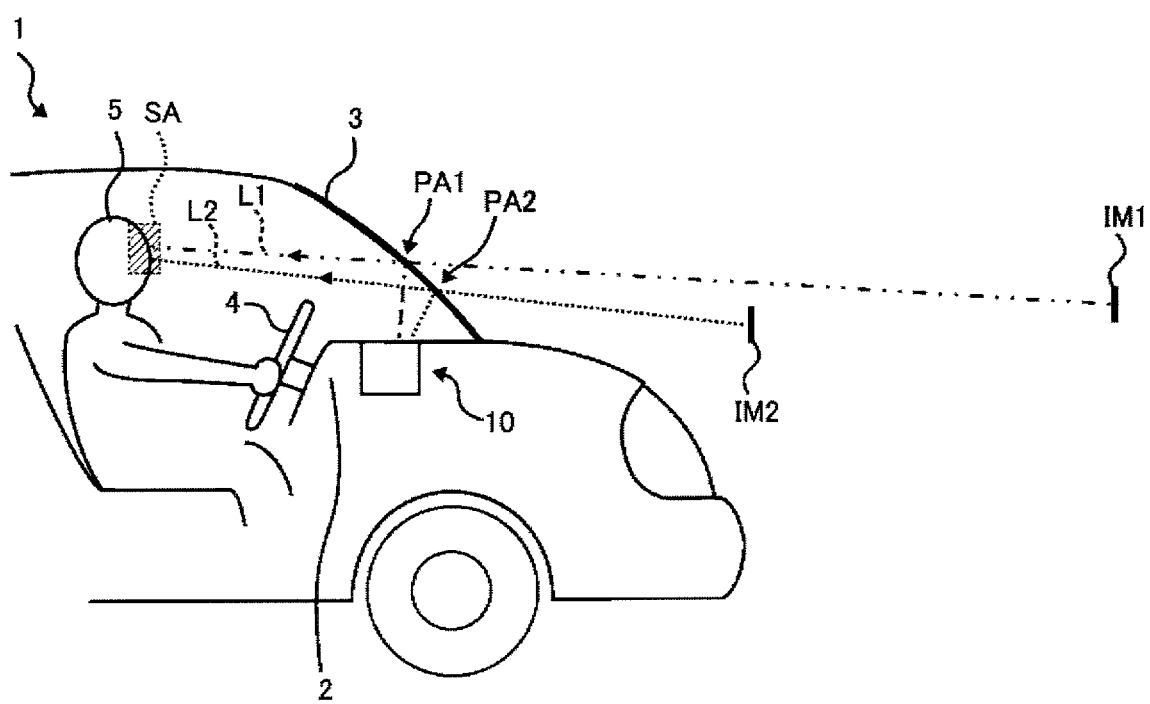
FIG. 1 is a diagram for explaining a state where an image display device according to one embodiment of the present invention is mounted on a vehicle.

An image display device according to a first embodiment of the present invention will be described, by referring to the drawings.

The image display device according to this embodiment may be a device which forms virtual images at a plurality of positions having different distances from a viewing point, such as a vehicle head-up display device which forms the virtual image at each of a near position and a far position in front of a driver, for example.

FIG. 1 is a diagram for explaining a state where an image display device 10 according to one embodiment of the present invention is mounted on a vehicle 1. In the example illustrated in FIG. 1, the image display device 10 is embedded inside a dashboard 2 located in front of a steering wheel 4.

The image display device 10 emits light L1 of a first image toward a first incident area PA1 of a windshield 3, and emits light L2 of a second image toward a second incident area PA2 of the windshield 3. The windshield 3 corresponds to a translucent member in one embodiment of the present invention. Because the windshield 3 serves as a semi-reflecting surface, these lights (L1 and L2) are reflected from the windshield 3 toward a visible area SA of a driver 5, and reach the eyes of the driver 5. The driver 5 visually recognizes a first virtual image IM1 of the light L1 of the first image, and visually recognizes a second virtual image IM2 of the light L2 of the second image.

Figure 2:
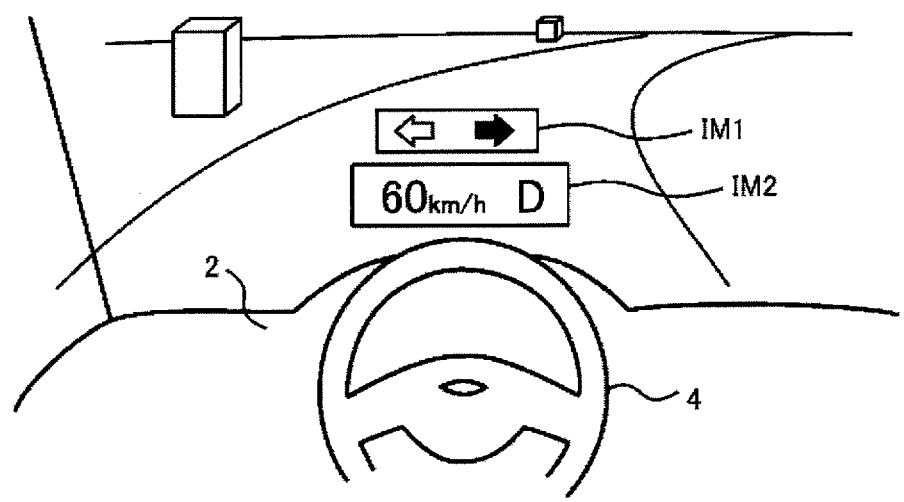
FIG. 2 is a diagram for explaining virtual images displayed by the image display device according to one embodiment of the present invention.

FIG. 2 is a diagram for explaining the virtual images displayed by the image display device 10 according to this embodiment. As illustrated in FIG. 1 and FIG. 2, the virtual images (IM1 and IM2) viewed from the driver 5 are formed at positions in front through the windshield 3. In the example illustrated in FIG. 1 and FIG. 2, the first virtual image IM1 is formed at a far position when compared to the second virtual image IM2.

Figure 3:
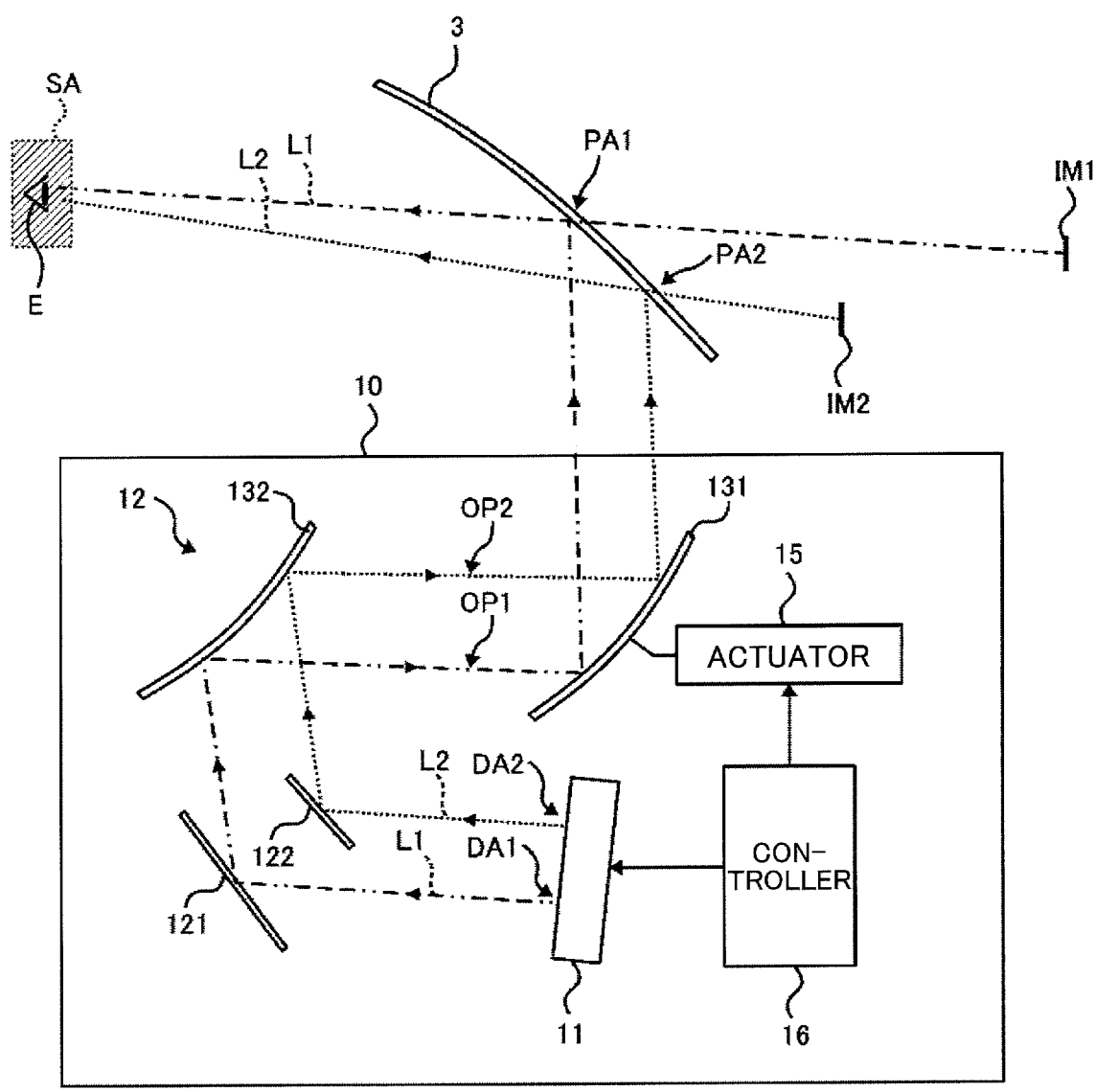
FIG. 3 is a diagram illustrating an example of a configuration of the image display device according to a first embodiment.

FIG. 3 is a diagram illustrating an example of a configuration of the image display device 10 according to the first embodiment. In the example illustrated in FIG. 3, the image display device 10 includes a display unit 11, a projection optical system 12, an actuator 15, and a controller 16.

The display unit 11 displays a first image and a second image corresponding to the first virtual image IM1 and the second virtual image IM2, respectively. The display unit 11 displays the first image and the second image in different display areas on the same plane. For example, the display unit 11 includes a device (liquid crystal display) that displays an image on a planar display surface, by transmitting or reflecting light from a light source, such as an LED or the like, at a liquid crystal panel.

Figure 4A:
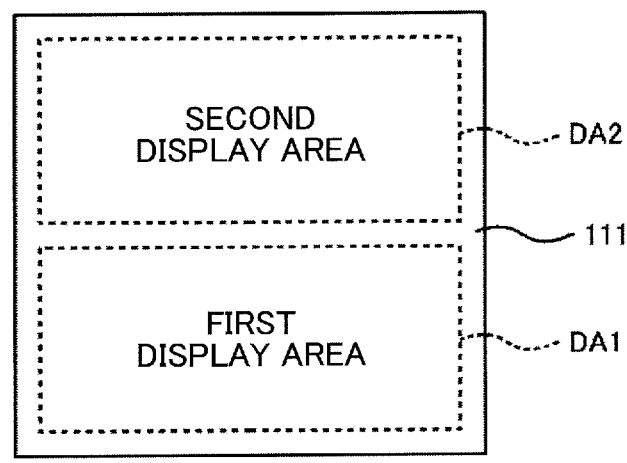
FIG. 4A and FIG. 4B are diagrams illustrating examples of a display surface and display areas of a display unit.
Figure 4B:
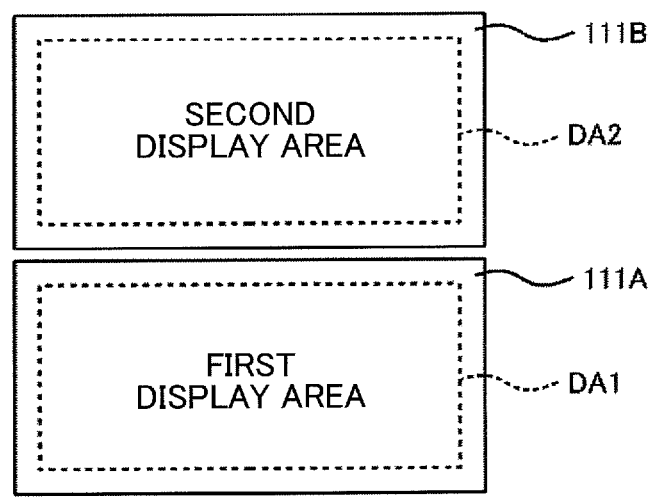

FIG. 4A and FIG. 4B are diagrams illustrating examples of the display surface and the display areas of the display unit 11. In the example illustrated in FIG. 4A, the display unit 11 includes a single display surface 111, and two display areas (DA1 and DA2) are provided on the display surface 111. The display unit 11 displays the first image in the first display area DA1, and displays the second image in the second display area DA2. When there a single display surface is provided as illustrated in FIG. 4A, the display unit 11 is formed using a single display means (liquid display or the like).

On the other hand, in the example illustrated in FIG. 4B, the display unit 11 includes two display surfaces 111A and 111B. The first display area DA1, which displays the first image, is provided on the display area 111A. The second display area DA2, which displays the second image, is provided on the display area 111B. When two display surfaces are provided as illustrated in FIG. 4B, the display unit 11 is formed using two display means (liquid crystal display or the like).

The projection optical system 12 directs the light L1 of the first image and the light L2 of the second image displayed on the display unit 11, toward the windshield 3. The projection optical system 12 sets an image point of the light L1 of the first image and an image point of the light L2 of the second image, respectively, so as to form the first virtual image IM1 and the second virtual image IM2 at positions having different distances from a viewing point E of the visible area SA.

In this embodiment, an optical path length of a first optical path OP1, and an optical path length of a second optical path OP2, are different. The first optical path OP1 is an optical path of the light L1 of the first image, reaching the first incident area PA1 of the windshield 3 from the first display area DA1 of the display unit 11. The second optical path OP2 is an optical path of the light L2 of the second image, reaching the second incident area PA2 of the windshield 3 from the second display area DA2 of the display unit 11. Because the optical path length of the first optical path OP1 and the optical path length of the second optical path OP2 are different, a difference is created between the image point of the light L1 of the first image and the image point of the light L2 of the second image, to create a difference between a distance from the viewing point E to the first virtual image IM1 and a distance from the viewing point E to the second virtual image IM2.

In the example illustrated in FIG. 3, the projection optical system 12 includes a first planar mirror 121, a second planar mirror 122, a first common curved mirror 131, and a second common curved mirror 132.

The first common curved mirror 131 and the second common curved mirror 132 are provided in common to the first optical path OP1 and the second optical path OP2, to concentrate or diverge the reflected light. The first common curved mirror 131 reflects the light L1 of the first image and the light L2 of the second image toward the windshield 3. The second common curved mirror 132 reflects the light L1 of the first image and the light L2 of the second image toward the first common curved mirror 131.

The first planar mirror 121 is provided in the first optical path OP1 between the display unit 11 and the second common curved mirror 132, and reflects the light L1 of the first image received from the display unit 11 toward the second common curved mirror 132. The second planar mirror 122 is provided in the second optical path OP2 between the display unit 11 and the second common curved mirror 132, and reflects the light L2 of the second image received from the display unit 11 toward the second common curved mirror 132.

The actuator 15 forms a mechanism which moves the first common curved mirror 131 so that the position of the visible area SA changes, according control performed by the controller 16, and is configured using a motor, a piezoelectric element, or the like, for example.

The controller 16 forms a circuit which controls the general operation of the image display device 10, and is configured using a computer which executes processes according to instruction codes of a program, for example. The controller 16 controls the generation of the image to be displayed on the display unit 11, the position, attitude, and inclination of the first common curved mirror 131 by the actuator 15, or the like.

In the image display device 10 illustrated in FIG. 3, the first image and the second image are displayed in different display areas (DA1 and DA2) on the same plane of the display unit 11. The light L1 of the first image displayed in the first display area DA1 is incident to the first planar mirror 121, reflected from the first planar mirror 121 toward the second common curved mirror 132, reflected from the second common curved mirror 132 toward the first common curved mirror 131, reflected from the first common curved mirror 131 toward the windshield 3, to become incident to the first incident area PA1 of the windshield 3. In addition, the light L2 of the second image displayed in the second display area DA2 is incident to the second planar mirror 122, reflected from the second planar mirror 122 toward the second common curved mirror 132, reflected from the second common curved mirror 132 toward the first common curved mirror 131, reflected from the first common curved mirror 131 toward the windshield 3, to become incident to the second incident area PA2 of the windshield 3. The light L1 of the first image and the light L2 of the second image, incident to the windshield 3, are respectively reflected toward the visible area SA, and reach the eyes of the driver 5 within the visible area SA. When viewed from the viewing point E of the driver 5, the first virtual image IM1 of the light L1 of the first image and the second virtual image IM2 of the light L2 of the second image are formed at the positions in front through the windshield 3. As illustrated in FIG. 3, the first optical path OP1 of the light L1 of the first image is longer compared to the second optical path OP2 of the light L2 of the second image. For this reason, when compared to the image point of the light L2 of the second image, the length of the optical path to the image point of the light L1 of the first image from the first common curved mirror 131 is longer. Accordingly, the first virtual image IM1 is formed at a far position from the viewing point E when compared to the second virtual image IM2.

As described above, according to the image display device 10 according to this embodiment, the first image and the second image are displayed in the different display areas (DA1 and DA2) on the same plane of the display unit 11. The image point of the light L1 of the first image and the image point of the light L2 of the second image are set separately in the projection optical system 12, and thus, the first virtual image IM1 and the second virtual image IM2 are foimed at the positions having different distances from the viewing point E. For this reason, when compared to cases where the display areas of the first image and the second image are not located on the same plane (such as a case where different screens arranged at different positions are used, or the like), the configuration can be simplified, and the size of the device can be reduced.

In addition, according to the image display device 10 according to this embodiment, by displaying the two images (first image and second image) on the single display surface 111, a common display means can be used for the two images, to make it possible to further simplify the configuration of the display unit 11.

Further, according to the image display device 10 according to this embodiment, by respectively displaying the two images (first image and second image) on the two display surfaces 111A and 111B, an independent display means can be provided for each of the images, to make it easier to set different display characteristics (resolution, luminance, or the like) for each of the images.

Moreover, according to this embodiment, by concentrating or diverging the reflected light at the first common curved mirror 131 and the second common curved mirror 132, it is possible to set characteristics, such as a focal distance or the like of the projection optical system 12, using a simple configuration. When the two images (first image and second image) are enlarged at the first common curved mirror 131 and the second common curved mirror 132, the size of each of the images is relatively small in the optical paths (first optical path OP1 and second optical path OP2) between the display unit 11 and the second common curved mirror 132. For this reason, by providing the planar mirrors (first planar mirror and second planar mirror) between the display unit 11 and the second common curved mirror 132, it is possible to reduce the size of the planar mirrors.

Furthermore, according to this embodiment, by driving the first common curved mirror 131, which reflects the lights (L1 and L2) of the two images toward the windshield 3, by the actuator 15, the position of the visible area SA can be changed. Consequently, compared to a case where a plurality of mirrors are moved to change the position of the visible area SA, it is possible to simplify the configuration because the number of actuators can be reduced.

Figure 5:
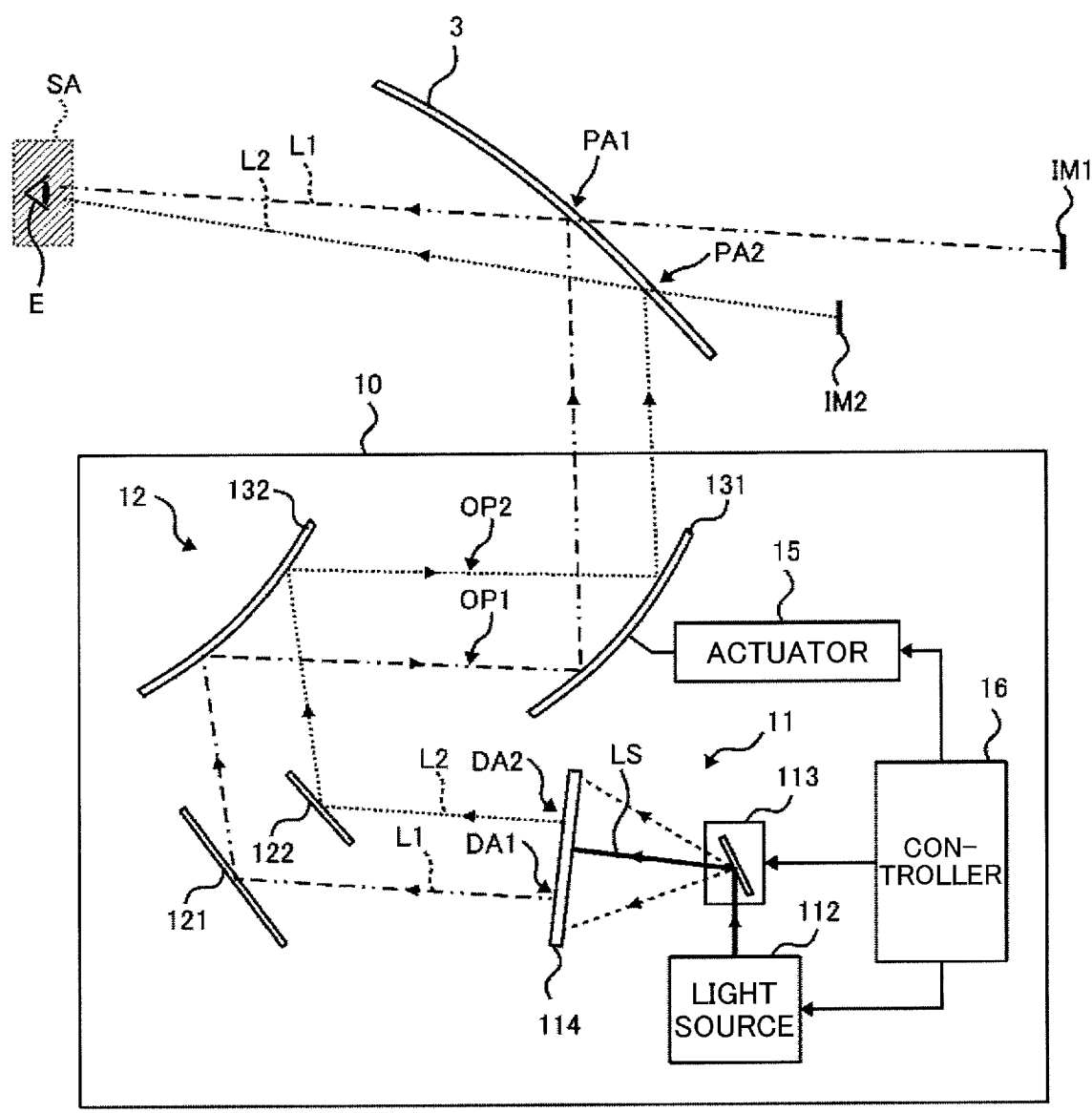
FIG. 5 is a diagram illustrating one modification of the display unit.

FIG. 5 is a diagram illustrating one modification of the display unit 11. In the modification illustrated in FIG. 5, the display unit 11 includes a light source 112, such as a laser device or the like, a scanner 113 which reflects a light beam LS from the light source 112, and a screen 114 where the Images (first image and second image) are imaged by the light beam LS that is reflected and caused to scan by the scanner 113. The scanner 113 is a MEMS element having a mirror surface with an inclination that changes according to the control performed by the controller 16, for example. The controller 16 controls the luminance of each color of the light beam LS generated from the light source 112, and the inclination angle of the scanner 113, to image a predetermined image on the screen 114. According to this modification, because the two images (first image and second image) are imaged in different areas on the same plane of the screen 114, it is unnecessary to adjust the beam diameter of the light beam incident to the screen 114 for each of the images.

The display unit 11, besides that used in the modification described above, may be a display device which displays an image by irradiating light onto a MEMS element having a large number of micro-mirror surfaces arranged in an array to reflect the light by the MEMS element, a display device which includes a large number of spontaneous light emission elements, such as organic EL elements or the like, arranged in an array, or the like.

Second Embodiment

Figure 6:
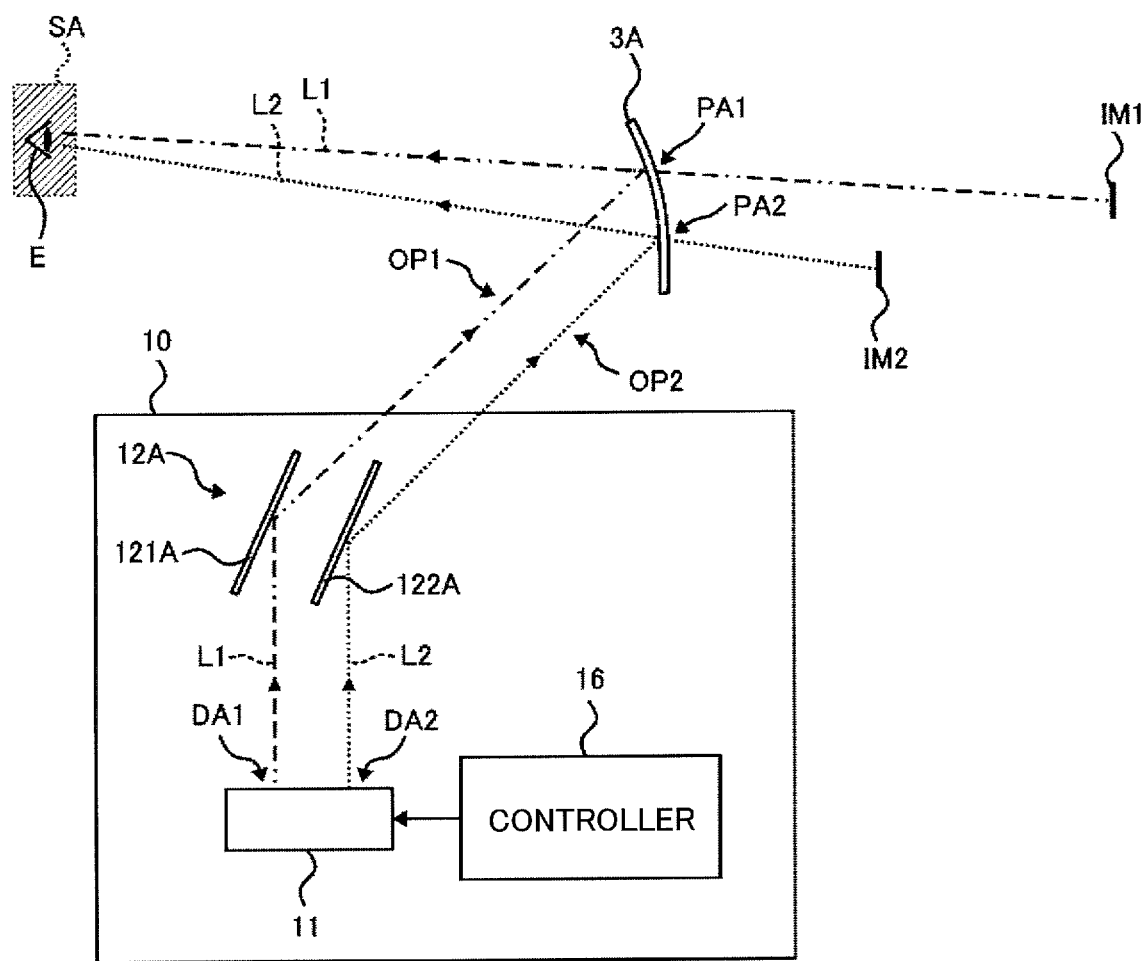
FIG. 6 is a diagram illustrating an example of the configuration of the image display device according to a second embodiment.

Next, a second embodiment of the present invention will be described. FIG. 6 is a diagram illustrating an example of the configuration of the image display device 10 according to the second embodiment. The image display device 10 illustrated in FIG. 6 omits the actuator 15 of the image display device 10 illustrated in FIG. 3, and replaces the projection optical system 12 by a projection optical system 12A, but the configuration of other parts are similar to that of the image display device 10 illustrated in FIG. 3. The image display device 10 according to the second embodiment supplies the light L1 of the first image and the light L2 of the second image to a combiner 3A. The combiner 3A is arranged in front of the windshield 3, for example, and the driver 5 visually recognizes the first virtual image IM1 and the second virtual image IM2 through the combiner 3A. The combiner 3A corresponds to the translucent member in one embodiment of the present invention.

The projection optical system 12A includes a first planar mirror 121A, and a second planar mirror 122A. The first planar mirror 121A reflects the light L1 of the first image received from the display unit 11 toward the first incident area PA1 of the combiner 3A. The second planar mirror 122A reflects the light L2 of the second image received from the display unit 11 toward the second incident area PA2 of the combiner 3A.

As illustrated in FIG. 6, the optical path length of the first optical path OP1 of the light L1 of the first image is longer than the optical path length of the second optical path OP2 of the light L2 of the second image. For this reason, the first virtual image IM1 of the light L1 of the first image is formed at the far position from the viewing point E when compared to the second virtual image IM2 of the light L2 of the second image.

According to this embodiment, it is also possible to obtain effects similar to those obtainable in the first embodiment.

Third Embodiment

Figure 7:
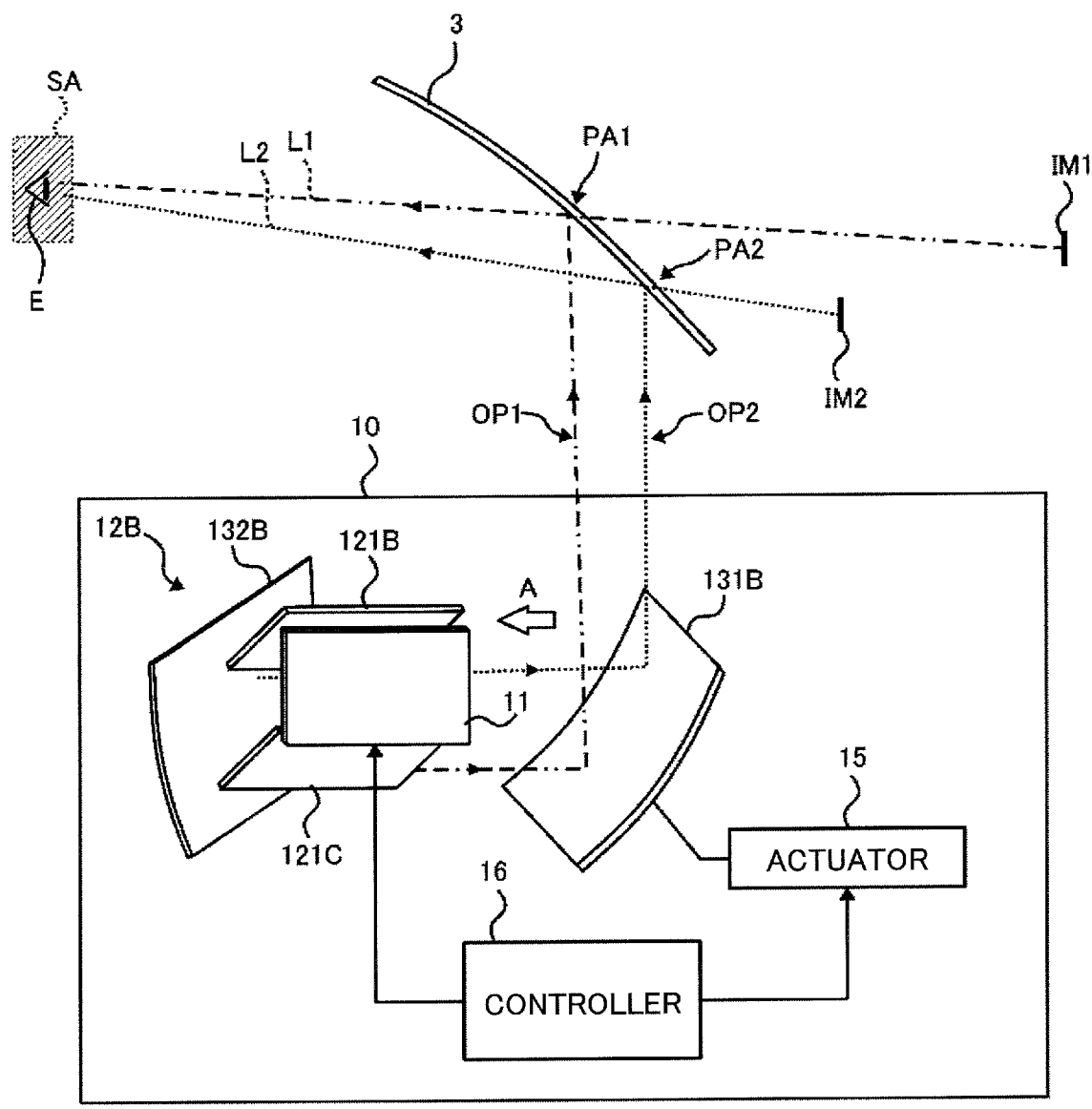
FIG. 7 is a diagram illustrating an example of the configuration of the image display device according to a third embodiment.
Figure 8:
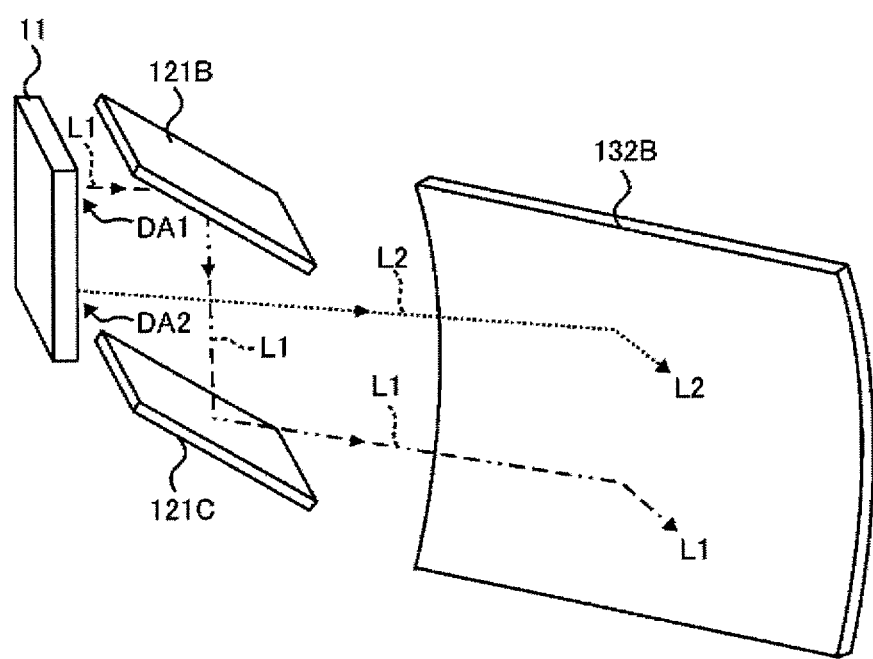
FIG. 8 is a diagram of a projection optical system in the image display device illustrated in FIG. 7, viewed in a direction indicated by an arrow A.

Next, a third embodiment of the present invention will be described. FIG. 7 is a diagram illustrating an example of the configuration of the image display device 10 according to the third embodiment. FIG. 8 is a diagram of a projection optical system 12B in the image display device 10 illustrated in FIG. 7, viewed in a direction indicated by an arrow A. The image display device 10 illustrated in FIG. 7 and FIG. 8 replaces the projection optical system 12 of the image display device 10 illustrated in FIG. 3 by the projection optical system 12B, but the configuration of other parts are similar to that of the image display device 10 illustrated in FIG. 3.

The projection optical system 12B includes first planar mirrors 121B and 121C, a first common curved mirror 131B, and a second common curved mirror 132B.

The first common curved mirror 131B and the second common curved mirror 132B are provided in common to the first optical path OP1 and the second optical path OP2, to concentrate or diverge the reflected light. The first common curved mirror 131B reflects the light L1 of the first image and the light L2 of the second image toward the windshield 3. The second common curved mirror 132B reflects the light L1 of the first image and the light L2 of the second image toward the first common curved mirror 131B.

The first planar mirrors 121B and 121C are provided in series in the first optical path OP1 between the display unit 11 and the second common curved mirror 132B. As illustrated in FIG. 8, the first planar mirror 121B reflects the light L1 of the first image received from the display unit 11 toward the first planar mirror 121C. The first planar mirror 121C reflects the incoming light L1 of the first image from the first planar mirror 121B toward the second common curved mirror 132B.

The actuator 15 moves the first common curved mirror 131B so that the position of the visible area SA changes, according the control performed by the controller 16.

In the image display device 10 illustrated in FIG. 7, the light L1 of the first image displayed in the first display area DA1 is incident to the first planar mirror 121B, reflected from the first planar mirror 121B toward the first planar mirror 121C, reflected from the first planar mirror 121C toward the second common curved mirror 132B, reflected from the second common curved mirror 132B toward the first common curved mirror 131B, reflected from the first common curved mirror 131B toward the windshield 3, to become incident to the first incident area PA1 of the windshield 3. In addition, the light L2 of the second image displayed in the second display area DA2 is directly incident to the second common curved mirror 132B, reflected from the second common curved mirror 132B toward the first common curved mirror 131B, reflected from the first common curved mirror 131B toward the windshield 3, to become incident to the second incident area PA2 of the windshield 3. The light L1 of the first image and the light L2 of the second image, incident to the windshield 3, are respectively reflected toward the visible area SA, and reach the eyes of the driver 5 within the visible area SA. As illustrated in FIG. 7, the first optical path OP1 of the light L1 of the first image is longer compared to the second optical path OP2 of the light L2 of the second image, and for this reason, when compared to the image point of the light L2 of the second image, the length of the optical path to the image point of the light L1 of the first image from the first common curved mirror 131B is longer. Accordingly, the first virtual image IM1 is formed at the far position from the viewing point E when compared to the second virtual image IM2.

According to this embodiment, it is also possible to obtain effects similar to those obtainable in the first embodiment.

Fourth Embodiment

Figure 9:
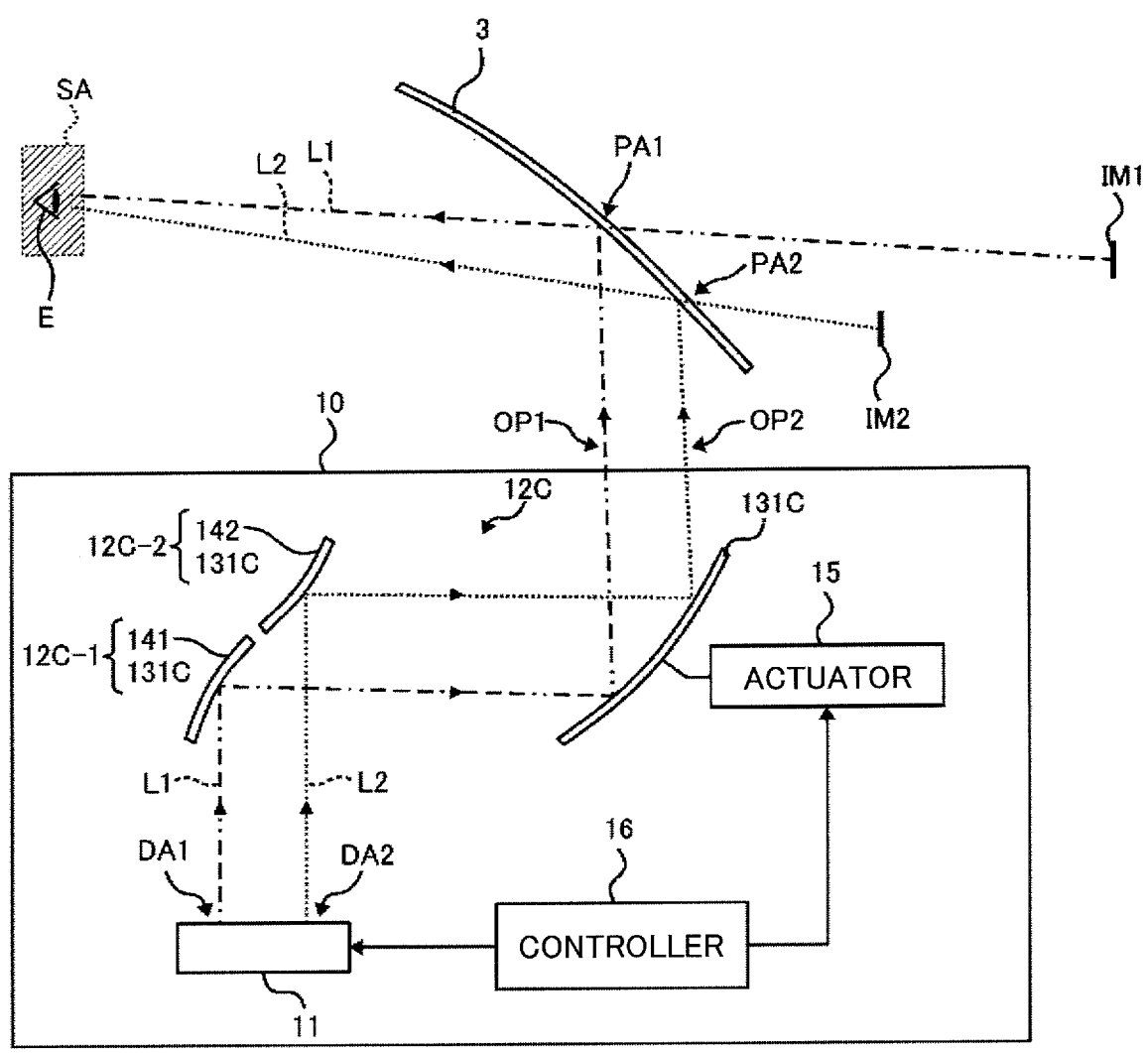
FIG. 9 is a diagram illustrating an example of the configuration of the image display device according to a fourth embodiment.

Next, a fourth embodiment of the present invention will be described. FIG. 9 is a diagram illustrating an example of the configuration of the image display device 10 according to the fourth embodiment. The image display device 10 illustrated in FIG. 9 replaces the projection optical system 12 of the image display device 10 illustrated in FIG. 3 by a projection optical system 12C, but the configuration of other parts are similar to that of the image display device 10 illustrated in FIG. 3.

The projection optical system 12C includes two optical systems (12C-1 and 12C-2) having different synthetic focal lengths. The first optical system 12C-1 forms the first optical path OP1 from the first display area DA1 of the display unit 11 and reaching the first incident area PA1 of the windshield 3. The second optical system 12C-2 forms the second optical path OP2 from the second display area DA2 of the display unit 11 and reaching the second incident area PA2 of the windshield 3. The synthetic focal length of the first optical system 12C-1 is long compared to the synthetic focal length of the second optical system 12C-2. Because the synthetic focal length of the first optical system 12C-1 and the synthetic focal length of the second optical system 12C-2 are different, a difference is created between the image point of the light L1 of the first image and the image point of the light L2 of the second image, to create a difference between the distance from the viewing point E to the first virtual image IM1 and the distance from the viewing point E to the second virtual image IM2.

In the example illustrated in FIG. 9, the projection optical system 12C includes a first curved mirror 141, a second curved mirror 142, and a first common curved mirror 131C. The first optical system 12C-1 includes the first curved mirror 141 and the first common curved mirror 131C, and the second optical system 12C-2 includes the second curved mirror 142 and the first common curved mirror 131C.

The first common curved mirror 131C is provided in common to the first optical path OP1 and the second optical path OP2, to concentrate or diverge the reflected light. The first common curved mirror 131C reflects the light L1 of the first image and the light L2 of the second image toward the windshield 3.

The first curved mirror 141 is provided in the first optical path OP1 between the display unit 11 and the first common curved mirror 131C, to concentrate or diverge the reflected light. The first curved mirror 141 reflects the light L1 of the first image received from the display unit 11 toward the first common curved mirror 131C. The second curved mirror 142 is provided in the second optical path OP2 between the display unit 11 and the first common curved mirror 131C, to concentrate or diverge the reflected light. The second curved mirror 142 reflects the light L2 of the second image received from the display unit 11 toward the first common curved mirror 131C.

The actuator 15 moves the first common curved mirror 131C so that the position of the visible area SA changes, according to the control performed by the controller 16.

In the image display device 10 illustrated in FIG. 9, the light L1 of the first image displayed in the first display area DA1 is incident to the first curved mirror 141, reflected from the first curved mirror 141 toward the first common curved mirror 131C, reflected from the first common curved mirror 131C toward the windshield 3, to become incident to the first incident area PA1 of the windshield 3. In addition, the light L2 of the second image displayed in the second display area DA2 is incident to the second curved mirror 142, reflected from the second curved mirror 142 toward the first common curved mirror 131C, reflected from the first common curved mirror 131C toward the windshield 3, to become incident to the second incident area PA2 of the windshield 3. The light L1 of the first image and the light L2 of the second image, incident to the windshield 3, are respectively reflected toward the visible area SA, and reach the eyes of the driver 5 within the visible area SA. Because the synthetic focal length of the first optical system 12C-1 footing the first optical path OP1 is longer than the synthetic focal length of the second optical system 12C-2 forming the second optical path OP2, the first virtual image IM1 is formed at a far position from the viewing point E when compared to the second virtual image IM2.

In the image display device 10 according to this embodiment, the synthetic focal length of the first optical system 12C-1 is set by the first curved mirror 141 and the first common curved mirror 131C, and the synthetic focal length of the second optical system 12C-2 is set by the second curved mirror 142 and the first common curved mirror 131C. Because the synthetic focal lengths are respectively set in the two optical systems (the first optical system 12C-1 and the second optical system 12C-2), a difference can easily be created between the two focal stacking distances. By creating the difference between the synthetic focal lengths in the two optical systems (the first optical system 12C-1 and the second optical system 12C-2), it is possible to omit planar mirrors (for example, the first planar mirror 121 and the second planar mirror 122 illustrated in FIG. 3) for creating the difference between the optical path length of the first optical path OP1 and the optical path length of the second optical path OP2. For this reason, the configuration as a whole can further be simplified, and also enable the size of the device to be further reduced.

In addition, in the image display device 10 according to this embodiment, the lights of the two images (the first image and the second image) are reflected toward the first common curved mirror 131O by the two curved mirrors (the first curved mirror 141 and the second curved mirror 142). Hence, the two optical paths (the first optical path OP1 and the second optical path OP2) are respectively folded between the display unit 11 and the first common curved mirror 131C, to enable the size of the device to be reduced even further.

Fifth Embodiment

Figure 10:
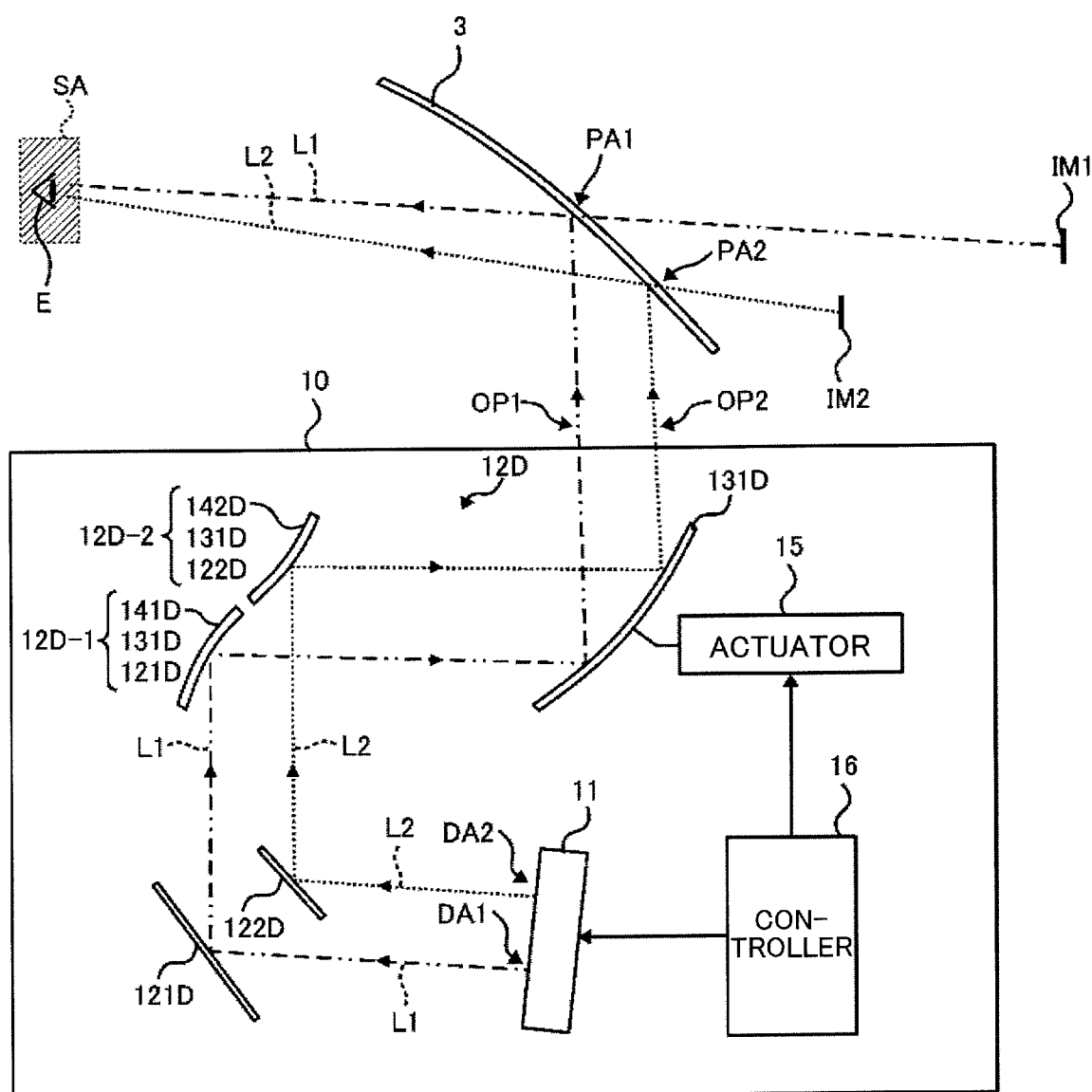
FIG. 10 is a diagram illustrating an example of the configuration of the image display device according to a fifth embodiment.

Next, a fifth embodiment of the present invention will be described. FIG. 10 is a diagram illustrating an example of the configuration of the image display device 10 according to the fifth embodiment. The image display device 10 illustrated in FIG. 10 replaces the projection optical system 12 of the image display device 10 illustrated in FIG. 3 by a projection optical system 12D, but the configuration of other parts are similar to that of the image display device 10 illustrated in FIG. 3.

The projection optical system 12D includes two optical systems (12D-1 and 12D-2) having different focal stacking distances, similarly to the projection optical system 12C (FIG. 9) described above.

In the example illustrated in FIG. 10, the projection optical system 12D includes a first planar mirror 121D, a second planar mirror 122D, a first curved mirror 141D, a second curved mirror 142D, and a first common curved mirror 131D. The first optical system 12D-1 includes the first planar mirror 121D, the first curved mirror 141D, and the first common curved mirror 131D. The second optical system 12D-2 includes the second planar mirror 122D, the second curved mirror 142D, and the first common curved mirror 131D.

The first common curved mirror 142D is provided in common to the first optical path OP1 and the second optical path OP2, to concentrate or diverge the reflected light. The first common curved mirror 131D reflects the light L1 of the first image and the light L2 of the second image toward the windshield 3.

The first curved mirror 141D is provided in the first optical path OP1 between the first planar mirror 121D and the first common curved mirror 131D, to concentrate or diverge the reflected light. The first curved mirror 141D reflects the light L1 of the first image received from the first planar mirror 121D toward the first common curved mirror 131D.

The second curved mirror 142D is provided in the second optical path OP2 between the second planar mirror 122D and the first common curved mirror 131D, to concentrate or diverge the reflected light. The second curved mirror 142D reflects the light L2 of the second image received from the second planar mirror 122D toward the first common curved mirror 131D.

The first planar mirror 121D is provided in the first optical path OP1 between the display unit 11 and the first curved mirror 141D, and reflects the light L1 of the first image received from the display unit 11 toward the first curved mirror 141D.

The second planar mirror 122D is provided in the second optical path OP2 between the display unit 11 and the second curved mirror 142D, and reflects the light L1 of the first image received from the display unit 11 toward the second curved mirror 142D.

In the image display device 10 illustrated in FIG. 10, the light L1 of the first image displayed in the first display area DA1 is incident to the first planar mirror 121D, reflected from the first planar mirror 121D toward the first curved mirror 141D, reflected from the first curved mirror 141D toward the first common curved mirror 131D, reflected by the first common curved mirror 131D toward the windshield 3, to become incident to the first incident area PA1 of the windshield 3. In addition, the light L2 of the second image displayed in the second display area DA2 is incident to the second planar mirror 122D, reflected from the second planar mirror 122D toward the second curved mirror 142D, reflected from the second curved mirror 142D toward the first common curved mirror 131D, reflected from the first common curved mirror 131D toward the windshield 3, to become incident to the second incident area PA2 of the windshield 3. The light L1 of the first image and the light of the second image, incident to the windshield 3, are respectively reflected toward the visible area SA, and reach the eyes of the driver 5 within the visible area SA. The synthetic focal length of the first optical system 12C-1 forming the first optical path OP1 is longer than the synthetic focal length of the second optical system 12C-2 forming the second optical path OP2. In addition, the optical path length of the first optical path OP1 is longer than the optical path length of the second optical path OP2. For this reason, the first virtual image IM1 is formed at a far position from the viewing point E when compared to the second virtual image IM2.

According to this embodiment, in addition to the difference between the focal stacking distances of the two optical systems (the first optical system 12D-1 and the second optical system 12D-2), a difference is set between the optical path length of the first optical path OP1 and the optical path length of the second optical path OP2, and thus, it becomes even easier to create the difference between the distances from the viewing pint of the position where the first virtual image IM1 is formed and the position where the second virtual image IM2 is formed. In addition, even when there is a limit to the range of the synthetic focal length that can be set in each of the optical systems, the difference between the optical path length of the first optical path OP1 and the optical path length of the second optical path OP2 may be set, so that the difference between the distances from the viewing point of the position where the first virtual image IM1 is formed and the position where the second virtual image IM2 is formed can be set within a wider range. Further, it is possible to independent adjust the relationships of the distances from the viewing point of the position where the first virtual image IM1 is formed and the position where the second virtual image IM2 is formed, and projection magnifications of the first and second virtual images IM1 and IM2.

Therefore, according to a first aspect of the embodiments, an image display device may direct light of a first image and light of a second image toward a translucent member, reflect the light of the first image and the light of the second image from the translucent member toward a visible area, and display a first virtual image corresponding to the first image and a second virtual image corresponding to the second image at positions visible through the translucent member when viewed from the visible area. This image display device may include a display unit configured to display the first image and the second image, and a projection optical system that directs the light of the first image and the light of the second image toward the translucent member. The display unit may display the first image and the second image at different display areas on the same plane. The projection optical system may set an image point of the light of the first image and an image point of the light of the second image, so that the first virtual image and the second virtual image are formed at positions having different distances from a viewing point within the visible area. According to this configuration, the first image and the second image may be displayed in the different display areas on the same plane of the display unit. For this reason, the configuration can be made more simple compared to a case where the display areas are not located on the same plane, and the size of the device can be reduced.

Preferably, according to the first aspect of the embodiments, the display unit may include a single display area which displays the first image and the second image. According to this configuration, because two images (first image and second image) may be displayed on the single display area, and a common display means may be used for the two images, it is possible to simplify the configuration of the display unit.

Preferably, according to the first aspect of the embodiments, the display unit may include one display area which displays the first image and one display area which displays the second image. According to this configuration, because one image (first image or second image) may be displayed in each of the two display areas, an independent display means may be provided for each image, to enable easier setting of different display characteristics (resolution, luminance, or the like) for each image.

In the image display device described above according to the first aspect of the embodiments, an optical path length of a first optical path from the display area of the first image on the display unit to an incident area of the translucent member to where the light of the first image reaches, and an optical path length a second optical path from the display area of the second image on the display unit to an incident area of the translucent member to where the light of the second image reaches, may be different. According to this configuration, because the optical path length of the first optical path and the optical path length of the second optical path are different, the position where the first virtual image corresponding to the first image is formed and the position where the second virtual image corresponding to the second image is formed are different when viewed from the viewing point within the visible area.

Preferably, according to the first aspect of the embodiments described above, the projection optical system may include at least one of a first planar mirror provided only in the first optical path, and a second planar mirror provided only in the second optical path. According to this configuration, by providing at least one of the first planar mirror and the second planar mirror, the optical path becomes longer compared to a case where these planar mirrors are not provided. For this reason, the optical path length of the first optical path and the optical path length of the second optical path can be set independently.

Preferably, according to the first aspect of the embodiments described above, the projection optical system may include at least one common curved mirror, provided in common to the first optical path and the second optical path, and configured to concentrate or diverge reflected light. According to this configuration, the characteristics (focal distance or the like) of the projection optical system is set by concentrating or diverging the reflected light by the common curved mirror.

Preferably, according to the first aspect of the embodiments described above, the projection optical system includes a first common curved mirror configured to reflect the light of the first image and the light of the second image toward the translucent member, to concentrate or diverge reflected light, and a second common curved mirror configured to reflect the light of the first image and the light of the second image toward the first common curved mirror, to concentrate or diverge the reflected light. At least one of the first planar mirror and the second planar mirror may be provided in an optical path between the display unit and the second common curved mirror. According to this configuration, the characteristics of the projection optical system, such as the focal distance or the like, is set by concentrating or diverging the reflected light by the first common curved mirror and the second common curved mirror. In addition, when the image is enlarged at the first common curved mirror and the second common curved mirror, the image (first image or second image) in the optical path (first optical path or second optical path) between the display unit and the second common curved mirror has a relatively small size. For this reason, it is possible to reduce the size of the planar mirrors (first planar mirror and second planar mirror).

Preferably, in the image display device described above according to a second aspect of the embodiments, the projection optical system may include a first optical system configured to form a first optical path from the display area of the first image on the display unit to an incident area of the translucent member to where the light of the first image reaches, and a second optical system configured to form a second optical path from the display area of the second image on the display unit to an incident area of the translucent member to where the light of the second image reaches. The first optical system and the second optical system may have different synthetic focal lengths. According to this configuration, because the first optical system forming the first optical path and the second optical system forming the second optical path have different synthetic focal lengths, the position where the first virtual image corresponding to the first image is formed, and the position where the second virtual image corresponding to the second image is formed, are different when viewed from the viewing point within the visible area.

Preferably, according to the second aspect of the embodiments described above, the projection optical system may include at least one of a first curved mirror provided only in the first optical path and configured to concentrate or diverge reflected light, and a second curved mirror provided only in the second optical path and configured to concentrate or diverge reflected light. According to this configuration, by providing at least one of the first curved mirror and the second curved mirror, it is possible to independently set the synthetic focal length of the first optical system and the synthetic focal length of the second optical system, and to easily create a difference between the two synthetic focal lengths. By creating the difference between the synthetic focal lengths of the two optical systems (first optical system and second optical system), it is possible to omit a planar mirror which is otherwise required to create the difference between the optical path length of the first optical path and the optical path length of the second optical path.

Preferably, according to the second aspect of the embodiments described above, the projection optical system may include at least one common curved mirror, provided in common to the first optical path and the second optical path, and configured to concentrate or diverge reflected light. According to this configuration, the characteristics (synthetic focal length or the like) of the projection optical system are set in each of the first optical system and the second optical system, by concentrating or diverging the reflected light at the common curved mirror. The configuration becomes simple by the use of the common curved mirror.

Preferably, according to the second aspect of the embodiments described above, the projection optical system may include a first common curved mirror, provided in common to the first optical path and the second optical path, and configured to reflect the light of the first image and the light of the second image toward the translucent member, to concentrate or diverge reflected light, the first curved mirror configured to reflect the light of the first image toward the first common curved mirror, and the second curved mirror configured to reflect the light of the second image toward the first common curved mirror. According to this configuration, the synthetic focal length of the first optical system is set by the first curved mirror and the first common curved mirror, and the synthetic focal length of the second optical system is set by the second curved mirror and the first common curved mirror. Because the synthetic focal length is set in each of the two optical systems (first optical system and second optical system), it is easier to create the difference between the two synthetic focal lengths. By creating the difference between the synthetic focal lengths of the two optical systems (first optical system and second optical system), it is possible to omit a planar mirror which is otherwise required to create the difference between the optical path length of the first optical path and the optical path length of the second optical path. In addition, according to this configuration, the lights of the two images (first image and second image) are respectively reflected by the two curved mirrors (first curved mirror and second curved mirror) toward the first common curved mirror. Hence, the optical paths (first optical path and second optical path) are folded between the display unit and the first common curved mirror, and enable the size of the device to be reduced.

Preferably, according to the second aspect of the embodiments described above, an actuator may be provided to move the first common curved mirror, so as to vary a position of the visible area. According to this configuration, the number of actuators can be reduced compared to a case where a plurality of mirrors are moved to change the position of the visible area, and make the configuration simple.

Preferably, according to the second aspect of the embodiments described above, an optical path length of the first optical path and an optical path length of the second optical path in the projection optical system may be different. For example, the projection optical system may include at least one of a first planar mirror provided only in the first optical path, and a second planar mirror provide only in the second optical path. According to this configuration, because the difference between the optical path length of the first optical path and the optical path length of the second optical path is set, in addition to the difference between the synthetic focal lengths in the two optical systems (first optical system and second optical system), the difference can easily be created between the distances from the viewing point to the position where the first virtual image is formed and the position where the second virtual image is formed.

According to each of the embodiments and modification described above, it is possible to form a plurality of virtual images having different distances from a viewing point, using a simple configuration.

Although the embodiments are numbered with, for example, "first," "second," "third," "fourth," or "fifth," the ordinal numbers do not imply priorities of the embodiments.

Although the present invention is described above with reference to several embodiments, the present invention is not limited to the embodiments described above, and various variations may be made.

For example, the number of planar mirrors, the number of curved mirrors, and the number of common curved mirrors of the projection optical system in the embodiments described above are merely examples, and the number of these mirrors may be set arbitrarily. In addition, the shape and the arrangement of each of the mirrors in the embodiments described above are also examples, and the mirrors may have other shapes and other arrangements.

In the embodiments described above, two virtual images having different distances from the viewing point are famed, however, in other embodiments of the present invention, three or more virtual images having different distances from the viewing point may be formed.

In the examples illustrated in FIG. 9 and FIG. 10, the two curved mirrors (141 and 142, and 141D and 142D) are physically separated, however, these curved mirrors may be integrally formed.

The translucent member in each of the embodiments described above has properties to transmit light, and a degree of transparency thereof may be arbitrarily selected according to the usage.

What is claimed is:

1. An image display device which directs light of a first image and light of a second image toward a translucent member, reflects the light of the first image and the light of the second image from the translucent member toward a visible area, and displays a first virtual image corresponding to the first image and a second virtual image corresponding to the second image at positions visible through the translucent member when viewed from the visible area, the image display device comprising:
   a display unit configured to display the first image and the second image, and
   a projection optical system that directs the light of the first image and the light of the second image toward the translucent member,
   wherein the display unit displays the first image and the second image at different display areas on a same plane, and includes a single display area which displays the first image and the second image, or one display area which displays the first image and one display area which displays the second image,
   wherein the projection optical system sets an image point of the light of the first image and an image point of the light of the second image, so that the first virtual image and the second virtual image are formed at positions having different distances from a viewing point within the visible area, and includes
      a first optical path from the display area of the first image on the display unit to an incident area of the translucent member to where the light of the first image reaches,
      a second optical path from the display area of the second image on the display unit to an incident area of the translucent member to where the light of the second image reaches, wherein an optical path length of the first optical path and an optical path length of the second optical path are different,
      at least one of a first planar mirror provided only in the first optical path, and a second planar mirror provided only in the second optical path,
      at least one common curved mirror, provided in common to the first optical path and the second optical path, and configured to concentrate or diverge reflected light,
      a first common curved mirror configured to reflect the light of the first image and the light of the second image toward the translucent member, to concentrate or diverge reflected light, and
      a second common curved mirror configured to reflect the light of the first image and the light of the second image toward the first common curved mirror, to concentrate or diverge the reflected light,
   wherein at least one of the first planar mirror and the second planar mirror is provided in an optical path between the display unit and the second common curved mirror.

2. The image display device as claimed in claim 1, wherein the projection optical system includes
   a first optical system configured to form the first optical path, and
   a second optical system configured to form the second optical path,
   wherein the first optical system and the second optical system have different synthetic focal lengths.

3. The image display device as claimed in claim 1, further comprising:
   an actuator configured to move the first common curved mirror, so as to vary a position of the visible area.

4. An image display device which directs light of a first image and light of a second image toward a translucent member, reflects the light of the first image and the light of the second image from the translucent member toward a visible area, and displays a first virtual image corresponding to the first image and a second virtual image corresponding to the second image at positions visible through the translucent member when viewed from the visible area, the image display device comprising:
   a display unit configured to display the first image and the second image, and a projection optical system that directs the light of the first image and the light of the second image toward the translucent member, wherein the display unit displays the first image and the second image at different display areas on a same plane, and includes a single display area which displays the first image and the second image, or one display area which displays the first image and one display area which displays the second image, wherein the projection optical system sets an image point of the light of the first image and an image point of the light of the second image, so that the first virtual image and the second virtual image are formed at positions having different distances from a viewing point within the visible area, and includes a first optical path from the display area of the first image on the display unit to an incident area of the translucent member to where the light of the first image reaches, a second optical path from the display area of the second image on the display unit to an incident area of the translucent member to where the light of the second image reaches, wherein an optical path length of the first optical path and an optical path length of the second optical path are different, at least one of a first curved mirror provided only in the first optical path and configured to concentrate or diverge reflected light, and a second curved mirror provided only in the second optical path and configured to concentrate or diverge reflected light, at least one common curved mirror, provided in common to the first optical path and the second optical path, and configured to concentrate or diverge reflected light, and a first common curved mirror, provided in common to the first optical path and the second optical path, and configured to reflect the light of the first image and the light of the second image toward the translucent member, to concentrate or diverge reflected light, wherein the first curved mirror is configured to reflect the light of the first image toward the first common curved mirror, and wherein the second curved mirror is configured to reflect the light of the second image toward the first common curved mirror.

5. The image display device as claimed in claim 4, further comprising:

an actuator configured to move the first common curved mirror, so as to vary a position of the visible area.

* * * * *